(12) United States Patent
Kanyanta et al.

(10) Patent No.: US 10,737,327 B2
(45) Date of Patent: Aug. 11, 2020

(54) SUPER HARD CONSTRUCTIONS AND METHODS OF MAKING SAME

(71) Applicant: ELEMENT SIX (UK) LIMITED, Didcot, Oxfordshire (GB)

(72) Inventors: Valentine Kanyanta, Didcot (GB); Miriam Miranda-Fernandez, Didcot (GB); Jonee Christine Paredes Zunega, Didcot (GB); Xiaoxue Zhang, Didcot (GB); Mehmet Serdar Ozbayraktar, Didcot (GB)

(73) Assignee: Element Six (UK) Limited, Didcot, Oxfordshire (GB)

( * ) Notice: Subject to any disclaimer, the term of this patent is extended or adjusted under 35 U.S.C. 154(b) by 0 days.

(21) Appl. No.: 16/066,534

(22) PCT Filed: Dec. 19, 2016

(86) PCT No.: PCT/EP2016/081675
§ 371 (c)(1),
(2) Date: Jun. 27, 2018

(87) PCT Pub. No.: WO2017/114677
PCT Pub. Date: Jul. 6, 2017

(65) Prior Publication Data
US 2019/0009339 A1 Jan. 10, 2019

(30) Foreign Application Priority Data
Dec. 31, 2015 (GB) .................................. 1523182.2

(51) Int. Cl.
*B24D 99/00* (2010.01)
*B24D 3/10* (2006.01)
(Continued)

(52) U.S. Cl.
CPC .................. *B22F 3/11* (2013.01); *B24D 3/10* (2013.01); *B24D 3/18* (2013.01); *B24D 3/26* (2013.01);
(Continued)

(58) Field of Classification Search
CPC ........ B22F 3/11; B22F 2005/001; B24D 3/10; B24D 3/18; B24D 3/26; B24D 3/32;
(Continued)

(56) References Cited

U.S. PATENT DOCUMENTS

| 3,594,141 A | 7/1971 | Houston et al. |
| 4,547,998 A | 10/1985 | Kajiyama |

(Continued)

FOREIGN PATENT DOCUMENTS

| CN | 102093080 B | 6/2011 |
| CN | 105209649 A | 12/2015 |

(Continued)

OTHER PUBLICATIONS

United Kingdom Patent Application No. GB1523182.2, Combined Search and Examination Report dated Apr. 29, 2016, 8 pages.
(Continued)

*Primary Examiner* — Pegah Parvini
(74) *Attorney, Agent, or Firm* — Dean W. Russell; Clark F. Weight; Kilpatrick Townsend & Stockton LLP

(57) ABSTRACT

A superhard polycrystalline construction comprises a body of polycrystalline superhard material comprising a structure comprising superhard material, the structure having porosity greater than 20% by volume and up to around 80% by volume. A method of forming such a superhard polycrystalline construction comprises forming a skeleton structure of a first material having a plurality of voids, at least partially filling some or all of the voids with a second material to form a pre-sinter assembly, and treating the pre-sinter assembly to (Continued)

sinter together grains of superhard material to form a body of polycrystalline superhard material comprising a first region of superhard grains, and an interpenetrating second region; the second region being formed of the other of the first or second material that does not comprise the superhard grains; the superhard grains forming a sintered structure having a porosity greater than 20% by volume and up to around 80% by volume.

7 Claims, 3 Drawing Sheets

(51) Int. Cl.
| | | |
|---|---|---|
| B24D 3/18 | (2006.01) | |
| B24D 3/26 | (2006.01) | |
| B24D 3/32 | (2006.01) | |
| E21B 10/567 | (2006.01) | |
| E21B 10/573 | (2006.01) | |
| B22F 3/11 | (2006.01) | |
| C22C 1/08 | (2006.01) | |
| C22C 26/00 | (2006.01) | |
| B32B 18/00 | (2006.01) | |
| C22C 29/06 | (2006.01) | |
| C04B 35/528 | (2006.01) | |
| C04B 35/645 | (2006.01) | |
| C04B 38/00 | (2006.01) | |
| C04B 38/04 | (2006.01) | |
| C04B 41/00 | (2006.01) | |
| C04B 41/45 | (2006.01) | |
| C04B 41/50 | (2006.01) | |
| C04B 41/51 | (2006.01) | |
| B22F 5/00 | (2006.01) | |

(52) U.S. Cl.
CPC ............ *B24D 3/32* (2013.01); *B24D 99/005* (2013.01); *B32B 18/00* (2013.01); *C04B 35/528* (2013.01); *C04B 35/645* (2013.01); *C04B 38/0038* (2013.01); *C04B 38/0045* (2013.01); *C04B 38/04* (2013.01); *C04B 41/009* (2013.01); *C04B 41/4586* (2013.01); *C04B 41/5002* (2013.01); *C04B 41/5133* (2013.01); *C04B 41/5144* (2013.01); *C22C 1/08* (2013.01); *C22C 26/00* (2013.01); *C22C 29/06* (2013.01); *E21B 10/567* (2013.01); *E21B 10/5735* (2013.01); *B22F 2005/001* (2013.01); *C04B 2235/3217* (2013.01); *C04B 2235/427* (2013.01); *C04B 2235/5436* (2013.01); *C04B 2235/80* (2013.01); *C04B 2237/363* (2013.01); *C04B 2237/401* (2013.01)

(58) Field of Classification Search
CPC ..... B24D 99/005; B32B 18/00; C04B 35/528; C04B 38/0038; C04B 38/0045; C04B 38/04; C04B 41/009; C04B 41/4586; C04B 41/5002; C04B 41/5133; C04B 41/5144; C04B 2235/3217; C04B 2235/427; C04B 2235/5436; C04B 2235/80; C04B 2237/363; C04B 2237/401; C22C 1/08; C22C 26/00; C22C 29/06; E21B 10/576; E21B 10/5735
See application file for complete search history.

(56) References Cited

U.S. PATENT DOCUMENTS

| | | |
|---|---|---|
| 5,658,194 A | 8/1997 | Micheletti |
| 2008/0222967 A1 | 9/2008 | Querel et al. |
| 2010/0096587 A1 | 4/2010 | Linford et al. |
| 2012/0066982 A1 | 3/2012 | Ramanath et al. |
| 2012/0103696 A1* | 5/2012 | DiGiovanni ............... B01J 3/06 |
| | | 175/425 |
| 2013/0168159 A1* | 7/2013 | Eyre ....................... E21B 10/46 |
| | | 175/432 |
| 2013/0213721 A1 | 8/2013 | Nilen et al. |

FOREIGN PATENT DOCUMENTS

| | | |
|---|---|---|
| GB | 2493083 A | 1/2013 |
| WO | 9110538 A1 | 7/1991 |
| WO | 99012867 A1 | 3/1999 |
| WO | 0018702 A1 | 4/2000 |
| WO | 2012170970 A2 | 12/2012 |
| WO | 2014161816 A2 | 10/2014 |
| WO | 2014161818 A2 | 10/2014 |
| WO | 2014186050 A1 | 11/2014 |
| WO | 2015101638 A1 | 7/2015 |
| WO | 2015167950 A1 | 11/2015 |

OTHER PUBLICATIONS

United Kingdom Patent Application No. GB1621555.0, Combined Search and Examination Report dated May 15, 2017, 10 pages.
International Patent Application No. PCT/EP2016/081675, International Search Report and Written Opinion dated Apr. 21, 2017, 20 pages.
Chinese Patent Application No. 201680077032.9, Office Action dated Sep. 27, 2019, 18 pages.

* cited by examiner

SUPER HARD CONSTRUCTIONS AND METHODS OF MAKING SAME

FIELD

This disclosure relates to super hard constructions and methods of making such constructions, particularly but not exclusively to constructions comprising polycrystalline diamond (PCD) structures attached to a substrate and for use as cutter inserts or elements for drill bits for boring into the earth.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of super hard tool inserts may be limited by fracture of the super hard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), polycrystalline cubic boron nitride (PCBN) or a thermally stable product TSP material such as thermally stable polycrystalline diamond.

Polycrystalline diamond (PCD) is an example of a super hard material (also called a superabrasive material) comprising a mass of substantially inter-grown diamond grains, forming a skeletal mass defining interstices between the diamond grains. PCD material typically comprises at least about 80 volume % of diamond and is conventionally made by subjecting an aggregated mass of diamond grains to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD. Materials that do not promote substantial coherent intergrowth between the diamond grains may themselves form strong bonds with diamond grains, but are not suitable solvent—catalysts for PCD sintering.

Cemented tungsten carbide which may be used to form a suitable substrate is formed from carbide particles being dispersed in a cobalt matrix by mixing tungsten carbide particles/grains and cobalt together then heating to solidify. To form the cutting element with a super hard material layer such as PCD or PCBN, diamond particles or grains or CBN grains are placed adjacent the cemented tungsten carbide body in a refractory metal enclosure such as a niobium enclosure and are subjected to high pressure and high temperature so that inter-grain bonding between the diamond grains or CBN grains occurs, forming a polycrystalline super hard diamond or polycrystalline CBN layer.

Cutting elements or tool inserts comprising PCD material are widely used in drill bits for boring into the earth in the oil and gas drilling industry. Rock drilling and other operations require high abrasion resistance and impact resistance. One of the factors limiting the success of the polycrystalline diamond (PCD) abrasive cutters is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear.

Methods used to improve the abrasion resistance of a PCD composite often result in a decrease in impact resistance of the composite.

The most wear resistant grades of PCD usually suffer from a catastrophic fracture of the cutter before it has worn out. During the use of these cutters, cracks grow until they reach a critical length at which catastrophic failure occurs, namely, when a large portion of the PCD breaks away in a brittle manner. These long, fast growing cracks encountered during use of conventionally sintered PCD, result in short tool life.

Furthermore, despite their high strength, polycrystalline diamond (PCD) materials are usually susceptible to impact fracture due to their low fracture toughness. Improving fracture toughness without adversely affecting the material's high strength and abrasion resistance is a challenging task.

There is therefore a need for a polycrystalline super hard composite such as a PCD composite that has good or improved abrasion, fracture and impact resistance and a method of forming such composites.

SUMMARY

Viewed from a first aspect there is provided a super hard polycrystalline construction comprising a body of polycrystalline super hard material, the body of polycrystalline super hard material comprising a structure comprising super hard material, the structure having porosity greater than 20% by volume and up to around 80% by volume.

Viewed from a second aspect there is provided a method of forming a super hard polycrystalline construction comprising:

forming a skeleton structure of a first material, the skeleton structure having a plurality of voids;

at least partially filling some or all of the voids in the skeleton structure with a second material to form a pre-sinter assembly; wherein one or other of the first material or the second material comprises grains of super hard material; and treating the pre-sinter assembly at an ultra-high pressure of around 5 GPa or greater and a temperature to sinter together the grains of super hard material to form a body of polycrystalline super hard material comprising a first region of super hard grains, and an interpenetrating second region;

the second region being formed of the other of the first or second material that does not comprise the super hard grains; the super hard grains forming a sintered structure of super hard material having a porosity greater than 20% by volume and up to around 80% by volume.

BRIEF DESCRIPTION OF THE DRAWINGS

Various versions will now be described by way of example and with reference to the accompanying drawings in which.

The same references refer to the same general features in all the drawings.

DETAILED DESCRIPTION

As used herein, a "super hard material" is a material having a Vickers hardness of at least about 28 GPa. Diamond and cubic boron nitride (cBN) material are examples of super hard materials.

As used herein, a "super hard construction" means a construction comprising a body of polycrystalline super hard material. In such a construction, a substrate may be attached thereto or alternatively the body of polycrystalline material may be free-standing and unbacked.

As used herein, polycrystalline diamond (PCD) is a type of polycrystalline super hard (PCS) material comprising a mass of diamond grains, a substantial portion of which are directly inter-bonded with each other and in which the content of diamond is at least about 80 volume percent of the material. In one example of PCD material, interstices between the diamond grains may be at least partly filled with a binder material comprising a catalyst for diamond. As used herein, "interstices" or "interstitial regions" are regions between the diamond grains of PCD material. In examples of PCD material, interstices or interstitial regions may be substantially or partially filled with a material other than diamond, or they may be substantially empty. PCD material may comprise at least a region from which catalyst material has been removed from the interstices, leaving interstitial voids between the diamond grains.

A "catalyst material" for a super hard material is capable of promoting the growth or sintering of the super hard material.

The term "substrate" as used herein means any substrate over which the super hard material layer is formed. For example, a "substrate" as used herein may be a transition layer formed over another substrate.

As used herein, the term "integrally formed" regions or parts are produced contiguous with each other and are not separated by a different kind of material.

Figure 1:
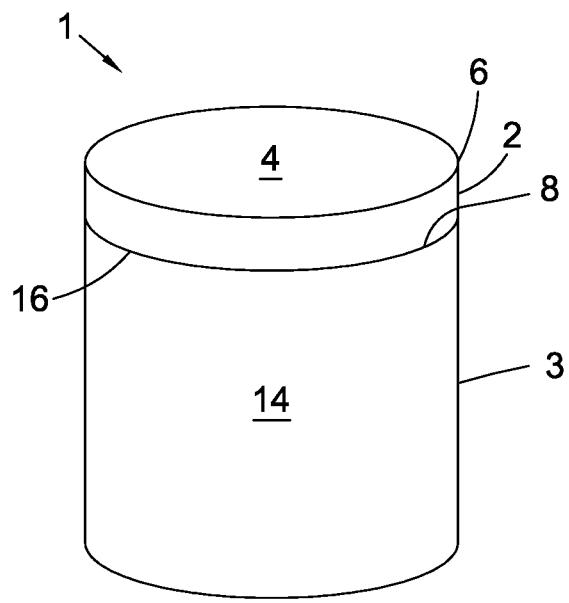
FIG. 1 is a perspective view of an example super hard cutter element or construction for a drill bit for boring into the earth.

In an example as shown in FIG. 1, a cutting element 1 includes a substrate 3 with a layer of super hard material 2 formed on the substrate 3. The substrate 3 may be formed of a hard material such as cemented tungsten carbide. The super hard material 2 may be, for example, polycrystalline diamond (PCD), or a thermally stable product such as thermally stable PCD (TSP). The cutting element 1 may be mounted into a bit body such as a drag bit body (not shown) and may be suitable, for example, for use as a cutter insert for a drill bit for boring into the earth.

The exposed top surface of the super hard material opposite the substrate forms the cutting face 4, which is the surface which, along with its edge 6, performs the cutting in use.

At one end of the substrate 3 is an interface surface 8 that forms an interface with the super hard material layer 2 which is attached thereto at this interface surface. As shown in FIG. 1, the substrate 3 is generally cylindrical and has a peripheral surface 14 and a peripheral top edge 16.

As used herein, a PCD grade is a PCD material characterised in terms of the volume content and size of diamond grains, the volume content of interstitial regions between the diamond grains and composition of material that may be present within the interstitial regions. A grade of PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material and said diamond grains may be natural or synthesised diamond grains.

Different PCD grades may have different microstructures and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

All of the PCD grades may comprise interstitial regions filled with material comprising cobalt metal, which is an example of catalyst material for diamond.

The PCD structure 2 may comprise one or more PCD grades.

Figure 2:
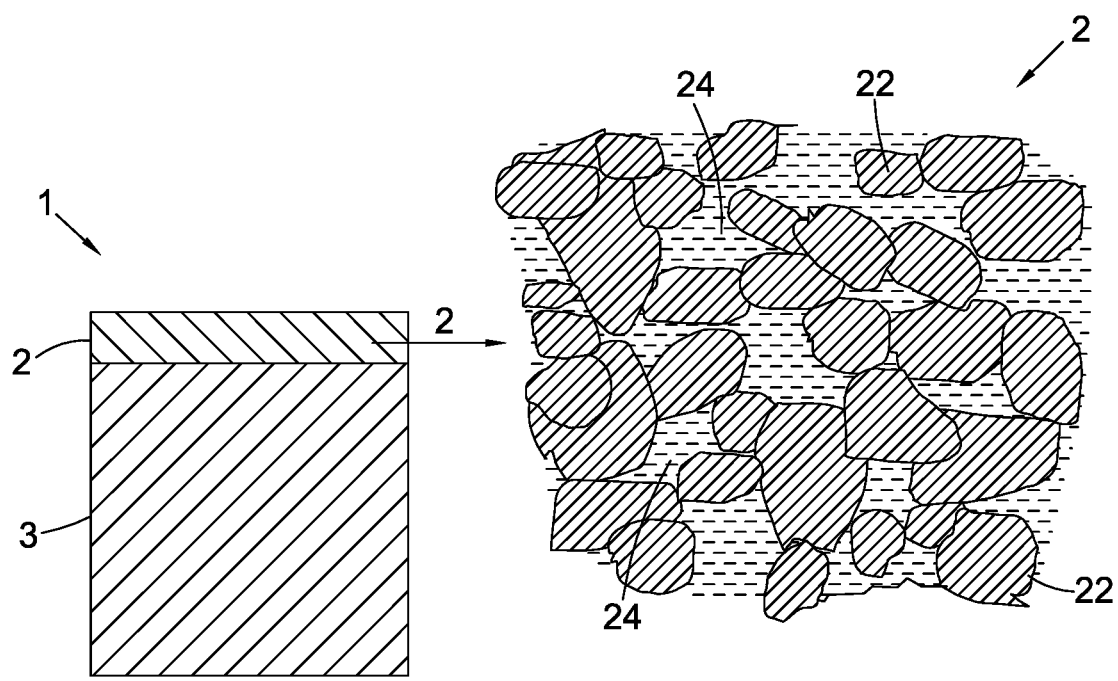
FIG. 2 is a schematic cross-section of a portion of a conventional PCD microstructure with interstices between the inter-bonded diamond grains filled with a non-diamond phase material.

FIG. 2 is a cross-section through conventional PCD material which may form the super hard layer 2 of FIG. 1 in a conventional cutter. During formation of a conventional polycrystalline diamond construction, the diamond grains 22 are directly interbonded to adjacent grains and the interstices 24 between the grains 22 of super hard material such as diamond grains in the case of PCD, may be at least partly filled with a non-super hard phase material. This non-super hard phase material, also known as a filler material, may comprise residual catalyst/binder material, for example cobalt, nickel or iron. The typical average grain size of the diamond grains 22 is larger than 1 micron and the grain boundaries between adjacent grains is therefore typically between micron-sized diamond grains, as shown in FIG. 2.

Polycrystalline diamond (PCD) is an example of a super hard material (also called a super abrasive material or ultra hard material) comprising a mass of substantially inter-grown diamond grains, forming a skeletal mass defining interstices between the diamond grains. PCD material typically comprises at least about 80 volume % of diamond and is conventionally made by subjecting an aggregated mass of diamond grains to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Materials that do not promote substantial coherent intergrowth between the diamond grains may themselves form strong bonds with diamond grains, but are not suitable solvent—catalysts for PCD sintering.

Figure 3A:
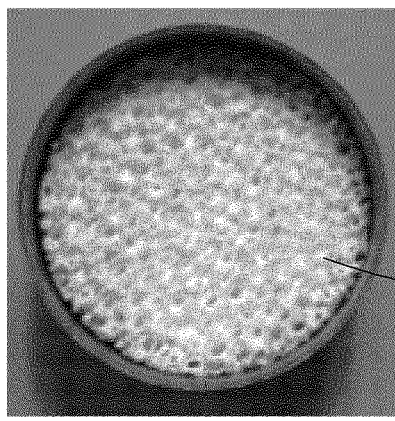
FIG. 3a is a plan view of a pre-sinter composite assembly of a material according to an example.
Figure 3B:
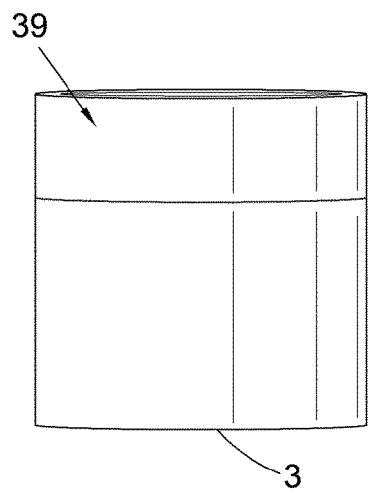
FIG. 3b is a side view of the sintered composite according to an example.
Figure 3C:
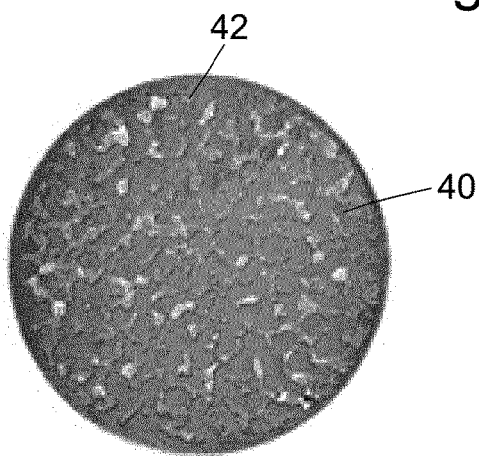
FIG. 3c is a plan view of a representation of a microstructure of an example composite.
Figure 4:
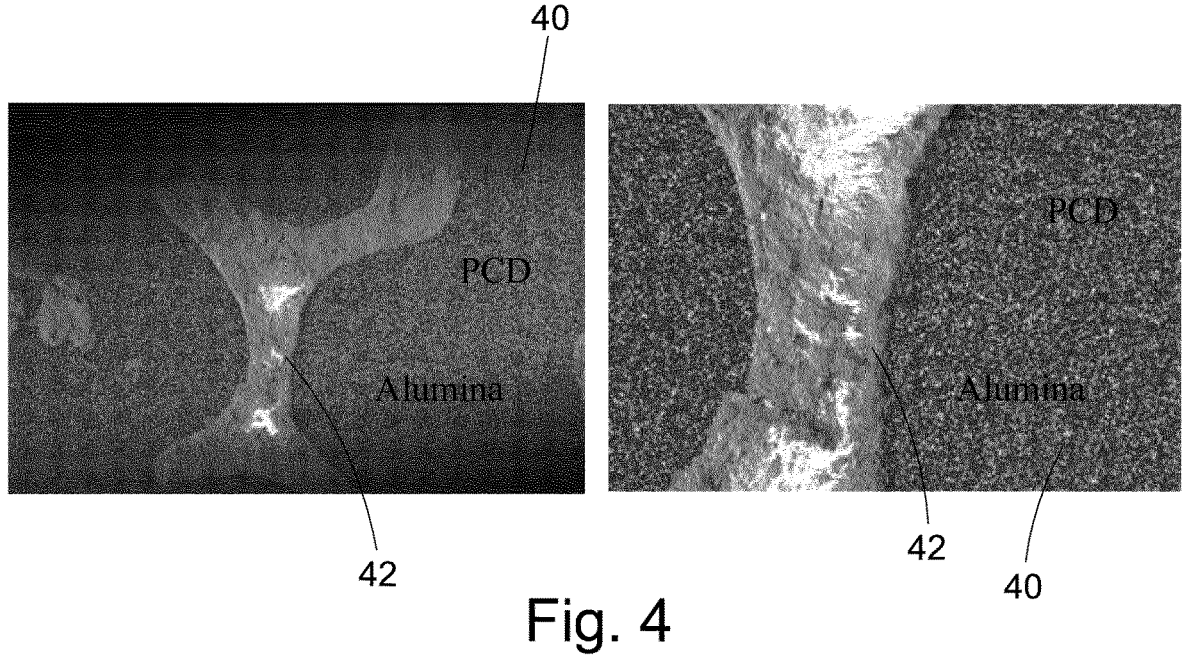
FIG. 4 is a schematic cross-sectional view of the microstructure of conventional PCD material.
Figure 5:
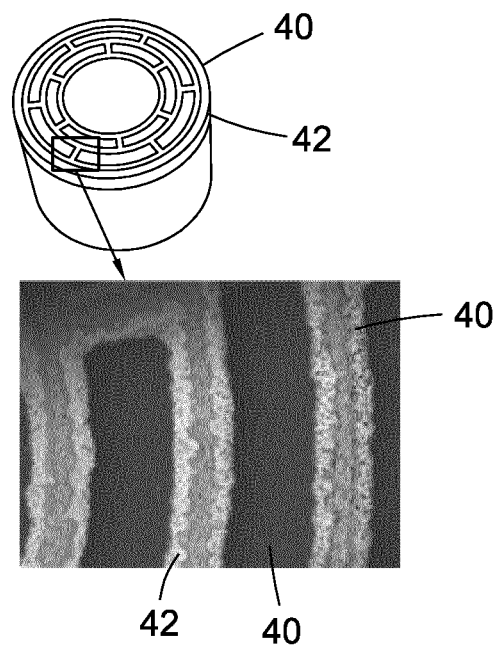
FIG. 5 is a perspective view from above and enlarged cross-sectional view through a portion of the microstructure of a material according to a further example.
Figure 6:
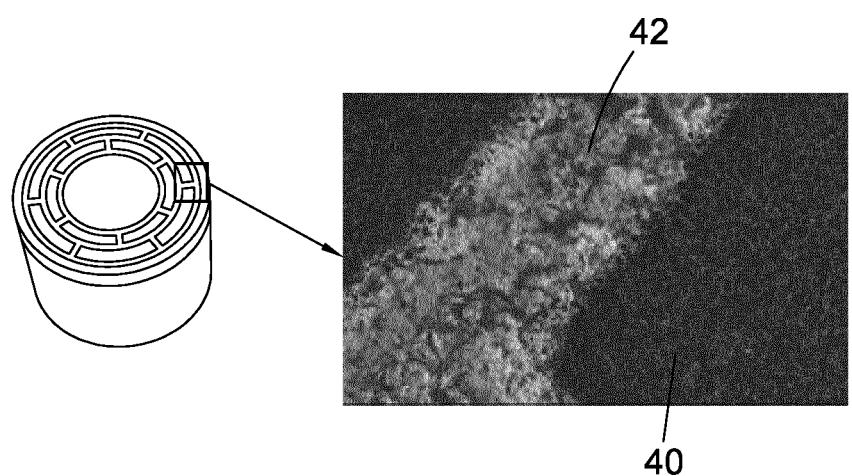
FIG. 6 is a cross-sectional view of a portion of the microstructure of a material according to a further example.

A first example of a composite material for use in forming a cutting element 39 in place of conventionally structured PCD material, as shown in FIG. 3b is described with reference to FIGS. 3a to 6. The examples of such a composite material comprise a three dimensionally (3D) continuous interpenetrating network of sintered inter-bonded polycrystalline super hard material 40 such as PCD, and one or more phases 42 comprising materials such as a ceramic, a metal alloy, hardmetals and/or polymers. In some examples, all respective phases, except the catalyst used for sintering the super hard material, are continuous in three dimensions. The super hard material 40 forms at least 10% of the composite by volume and up to around 80% of the composite by volume. The other phases 42 fill the remaining volume fraction. The secondary phases (such as any one or more of a ceramic, a metal alloy, a hardmetal and a polymer) may also be chemically removed after the composite is manufactured to form a porous super hard structure, with porosity greater than 20% by volume and up to around 80% by volume.

The construction and formation of examples of material as shown in FIGS. 3a to 6 are discussed in more detail below with reference to the following examples, which are not intended to be limiting.

Example 1

Commercially available alumina foam 42 as shown in FIG. 3a was infiltrated with a plurality of diamond particles having an average particle size of around 15 microns. In one method, diamond particles were added on top of the foam inside a niobium cup and the assembly was subjected to mechanical vibration in order to force the diamond particles to fill the pores inside the foam. In another method, a slurry of diamond particles was formed and poured on top of the foam in order to fill the pores. The assembly was then allowed to settle and dry. A tungsten carbide substrate with 13 wt % cobalt was placed on top of the diamond infiltrated alumina foam inside a niobium cup to form a pre-composite assembly. The pre-composite is then sintered at a pressure above 5 GPa and temperature of about 1400° C. in the presence of cobalt infiltrated from the WC—Co substrate. This forms an intergrown (interbonded) PCD skeleton 40 with a three dimensionally continuously interpenetrating structure of alumina 42.

Example 2

A PCD-titanium 3D continuously interpenetrating was formed by initially forming a titanium metal skeleton using 3D laser sintering of titanium powder. The skeleton was introduced into a niobium cup and diamond powder added to fill the pores in the titanium skeleton. In this case a bimodal diamond powder was used comprising around 15 wt % of diamond particles having an average grain size of around 2 microns and 85 wt % of diamond particles having an average grain size of around 22 microns. A tungsten carbide substrate with 13 wt % cobalt was then added and the assembly was subjected to mechanical vibration to ensure the loose powders fill the empty spaces in the titanium skeleton. The pre-composite was then sintered at a pressure above 5 GPa and temperature of about 1400° C. in the presence of cobalt infiltrated from the WC—Co substrate to form an interbonded PCD skeleton with a three dimensionally continuously interpenetrating structure of titanium.

The imbedded metal structure may be effective as an inhibitor to crack propagation and thereby potentially assist in increasing the toughness of the composite structure.

Example 3

In the above described examples 1 and 2, the process of making a PCD-Ceramic and PCD-Metal 3D continuously interpenetrating composite starts with forming a porous ceramic or metal and then infiltrating it with diamond. However, one may also start by forming a porous diamond green body and then infiltrating it with ceramic, metal, polymer or a combination thereof. Diamond green bodies may be prepared via conventional freeze casting techniques or other manufacturing methods such as injection moulding, 3D inkjet or laser printing and robocasting. The porous diamond green body may also comprise PCD containing aerogel structures which could be obtained from methods such as supercritical $CO_2$ drying. The porous green body is then infiltrated with a second phase such as a ceramic, a metal, a polymer or a combination thereof and the product sintered as described above with respect to examples 1 and 2. An alternative source of catalyst material for the PCD other than a WC substrate may be used in one or more examples such as admixing the catalyst such as Co into the diamond grains prior to sintering.

Example 4

A 3D interpenetrating network of PCD and metal of polymer or any leachable material is prepared via any of the examples 1 to 3 described above. The secondary phase(s) 42, namely any one or more of a metal, a polymer or any other leachable material are then removed via conventional chemical leaching techniques or any other suitable method to form a porous intergrown PCD structure. This porosity is not less than 20% by volume of the PCD body and may be up to around 80% by volume of the PCD body.

Further examples of the second phase material 42 which may be used include but are not limited to $Ti_6Al_4V$, and other metal alloys with similar properties, such as cobalt-chrome.

A number of PCD compacts formed according to the Examples 1 were compared in a vertical boring mill test with a commercially available polycrystalline diamond cutter element having the same average diamond grain size as that of the examples tested. In this test, the wear flat area was measured as a function of the number of passes of the cutter element boring into the workpiece. The results provide an indication of the total wear scar area plotted against cutting length. It will be seen that the PCD compacts formed according to the examples were able to achieve comparable and in some instances greater cutting length than that occurring in the conventional PCD compact which was subjected to the same test for comparison. Furthermore, in the examples a smaller wear scar area than the conventional PCD compact in this test was achieved with no spalling of the cutter.

Whilst not wishing to be bound by a particular theory, it is believed that the fracture performance of PCD may be improved through the introduction of a second phase which may assist in stopping crack propagation through the material and/or favourably divert cracks in the PCD material. The end result in application of the PCD material including such an interpenetrating network of second phase material of the type described is that, in use, where the wear rate is comparable to the crack growth rate, no cracks will be visible behind the wear scar thereby forming a smooth wear scar appearance with no chips or grains pulled out of the sintered PCD.

The addition of such a second phase may also have the effect of increasing the thermal stability of the PCD through the resultant lower cobalt content in the material of the invention compared to conventional PCD.

The composition and distribution of the second phase 42, may be tailored to the final application of the PCD material. It is believed possible to improve fracture resistance without significantly compromising the overall abrasion resistance of the material, which is desirable for PCD cutting tools.

Thus, it is believed that embodiments may provide a means of toughening PCD material without compromising its high abrasion resistance.

Thus, examples of a PCD material may be formed having that a combination of high abrasion and fracture performance.

The PCD element 39 described with reference to FIGS. 3*a* to 6 may be further processed after sintering. For example, catalyst material may be removed from a region of the PCD structure adjacent the working surface or the side surface or both the working surface and the side surface. This may be achieved by treating the PCD structure with acid to leach out either residual catalyst material from between the diamond grains or the second phase (42), or by other methods such as electrochemical methods. A thermally stable region, which may be substantially porous, extending a depth of at least about 50 microns or at least about 100 microns from a surface of the PCD structure, may thus be provided which may further enhance the thermal stability of the PCD element.

Furthermore, the PCD body in the structure of FIG. 3*b* comprising a PCD structure bonded to a cemented carbide support body may be created or finished by, for example, grinding, to provide a PCD element which is substantially cylindrical and having a substantially planar working surface, or a generally domed, pointed, rounded conical or frusto-conical working surface. The PCD element may be suitable for use in, for example, a rotary shear (or drag) bit for boring into the earth, for a percussion drill bit or for a pick for mining or asphalt degradation.

While various versions have been described with reference to a number of examples, those skilled in the art will understand that various changes may be made and equivalents may be substituted for elements thereof and that these examples are not intended to limit the particular examples or versions disclosed.

For example, in some embodiments of the method, the PCD material may be sintered for a period in the range from about 1 minute to about 30 minutes, about 2 minutes to about 15 minutes, or from about 2 minutes to about 10 minutes.

In some examples of the method, the sintering temperature may be in the range from about 1,200 degrees centigrade to about 2,300 degrees centigrade, about 1,400 degrees centigrade to about 2,000 degrees centigrade, about 1,450 degrees centigrade to about 1,700 degrees centigrade, or about 1,450 degrees centigrade to about 1,650 degrees centigrade. Also, whilst it is conventional to sinter PCD using a catalyst such as cobalt, a range of catalysing materials comprising metals and/or non-metals may be used.

Furthermore, whilst the examples have been described in the context of cutter elements, it will be understood that the examples offer multi-functionally enhanced physical, mechanical, thermal and electrical properties and may equally find use in a range of applications such as cutting, machining and polishing of ferrous and non-ferrous materials. Other applications may include but are not limited to light weight structural parts in the aerospace, automotive and defence industries, in heater dissipaters, or in hot air filters.

The invention claimed is:

1. A super hard polycrystalline diamond construction comprising a body of polycrystalline diamond material, the body of polycrystalline diamond material comprising a structure comprising polycrystalline diamond material, the structure having porosity greater than 20% by volume and up to around 80% by volume; the construction further comprising one or more secondary phases located in one or more pores in the structure; wherein one or more of the one or more secondary phases comprise Ti6Al4V; wherein the one or more secondary phases comprise an interpenetrating network through the polycrystalline diamond material.

2. The construction of claim 1, wherein the interpenetrating network is substantially continuous through the structure.

3. The construction of claim 1, wherein the polycrystalline diamond material forms at least 10% of the composite by volume and up to around 80% of the structure by volume.

4. The construction of claim 1, further comprising a substrate attached to the body of polycrystalline diamond material along an interface.

5. The construction of claim 1, wherein the polycrystalline diamond material comprises natural and/or synthetic diamond grains.

6. The construction according to claim 1, wherein at least a portion of the body of polycrystalline diamond material is substantially free of a catalyst material for diamond, said portion forming a thermally stable region.

7. The construction as claimed in claim 6, wherein the thermally stable region comprises at most 2 weight percent of catalyst material for diamond.

* * * * *